United States Patent

Manjikian

[11] 3,821,108
[45] June 28, 1974

[54] REVERSE OSMOSIS OR ULTRAFILTRATION MODULE

[76] Inventor: Serop Manjikian, P.O. 183, Del Mar, Calif. 92014

[22] Filed: May 23, 1972

[21] Appl. No.: 256,185

[52] U.S. Cl.............. 210/23, 210/321, 210/332, 210/433
[51] Int. Cl............. B01d 31/00, B01d 13/00
[58] Field of Search............ 210/23, 433, 321, 409, 210/408, 332

[56] References Cited
UNITED STATES PATENTS

| | | | |
|---|---|---|---|
| 2,946,444 | 7/1960 | Zievers et al. | 210/408 X |
| 3,355,382 | 11/1967 | Huntington | 210/321 X |
| 3,491,887 | 1/1970 | Maestrelli | 210/409 X |
| 3,498,910 | 3/1970 | Mendelson | 210/409 X |
| 3,541,004 | 11/1970 | Cooper et al. | 210/23 X |
| 3,616,929 | 11/1971 | Manjikian | 210/456 X |

Primary Examiner—Frank A. Spear, Jr.
Attorney, Agent, or Firm—Clement H. Allen

[57] ABSTRACT

A reverse osmosis or ultrafiltration module contains elongated membrane elements which have semipermeable membranes on their outer surfaces, and which are mounted on a frame rotatably mounted inside a pressure resistant container. Feed liquid is supplied to the module at elevated pressure, concentrated liquid is released from the module, and purified liquid is collected from the interiors of the membrane elements. During operation turbulence over the semipermeable membrane surfaces to insure separation efficiency and boundary layer control is achieved by rotating the frame supporting the membrane elements.

13 Claims, 7 Drawing Figures

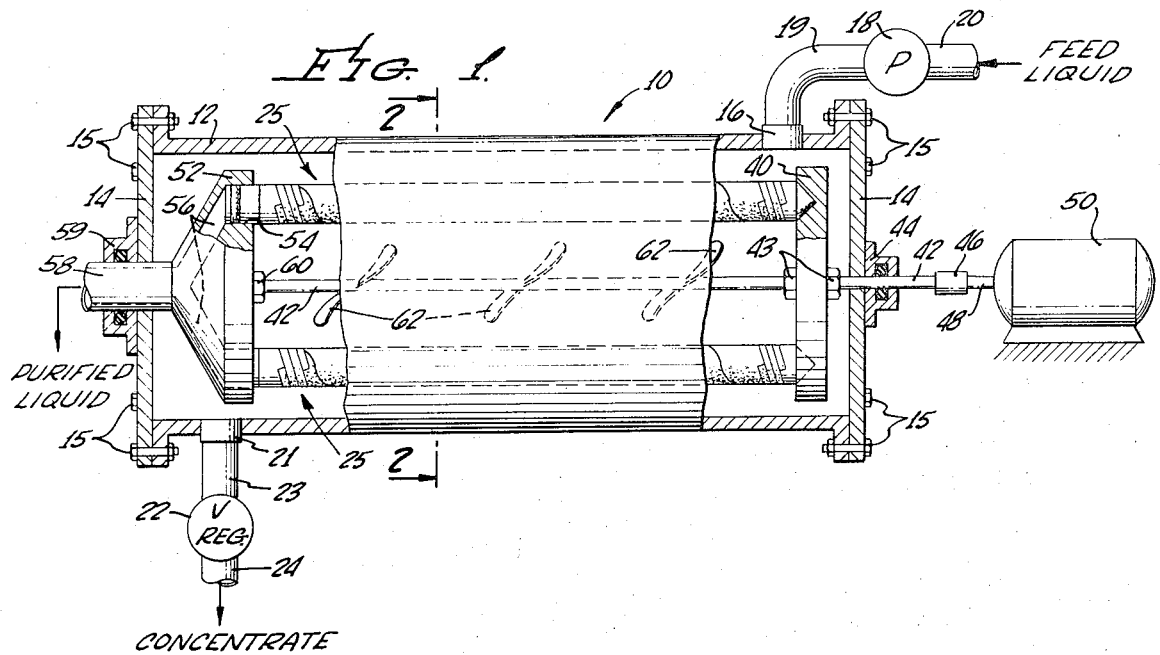
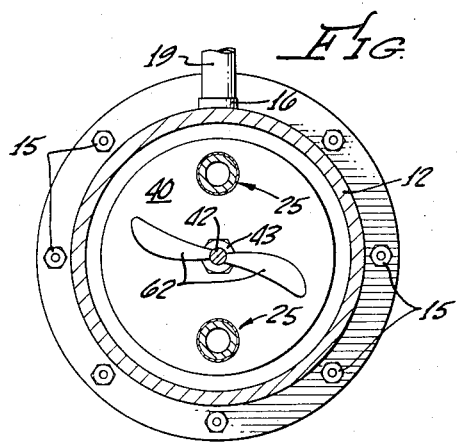
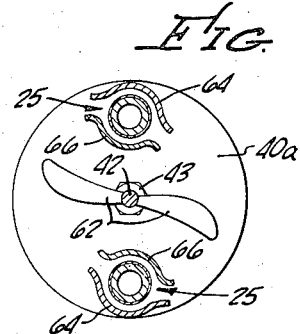
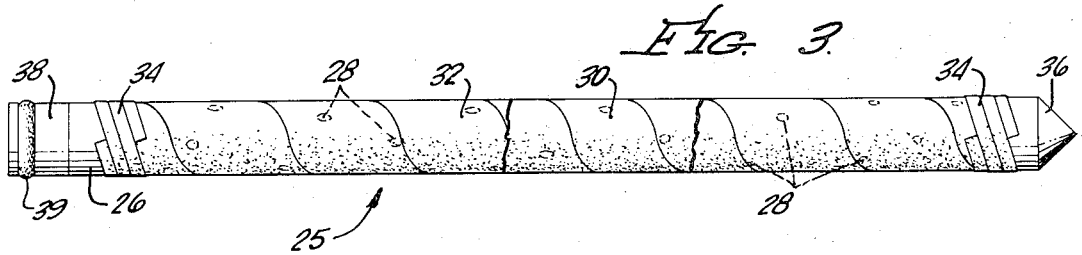

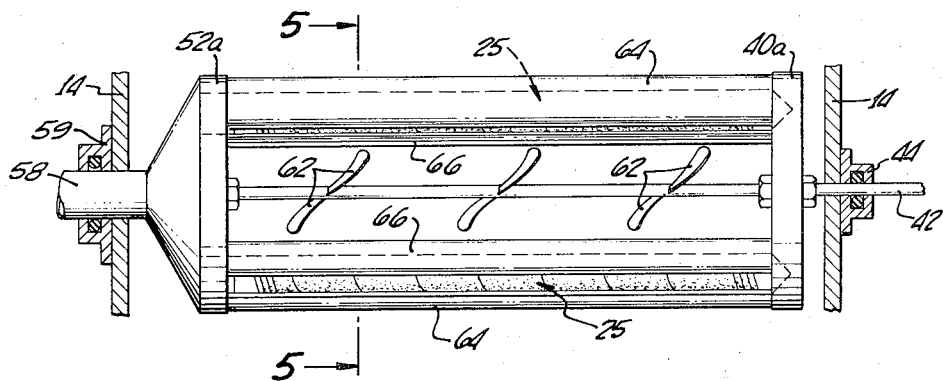
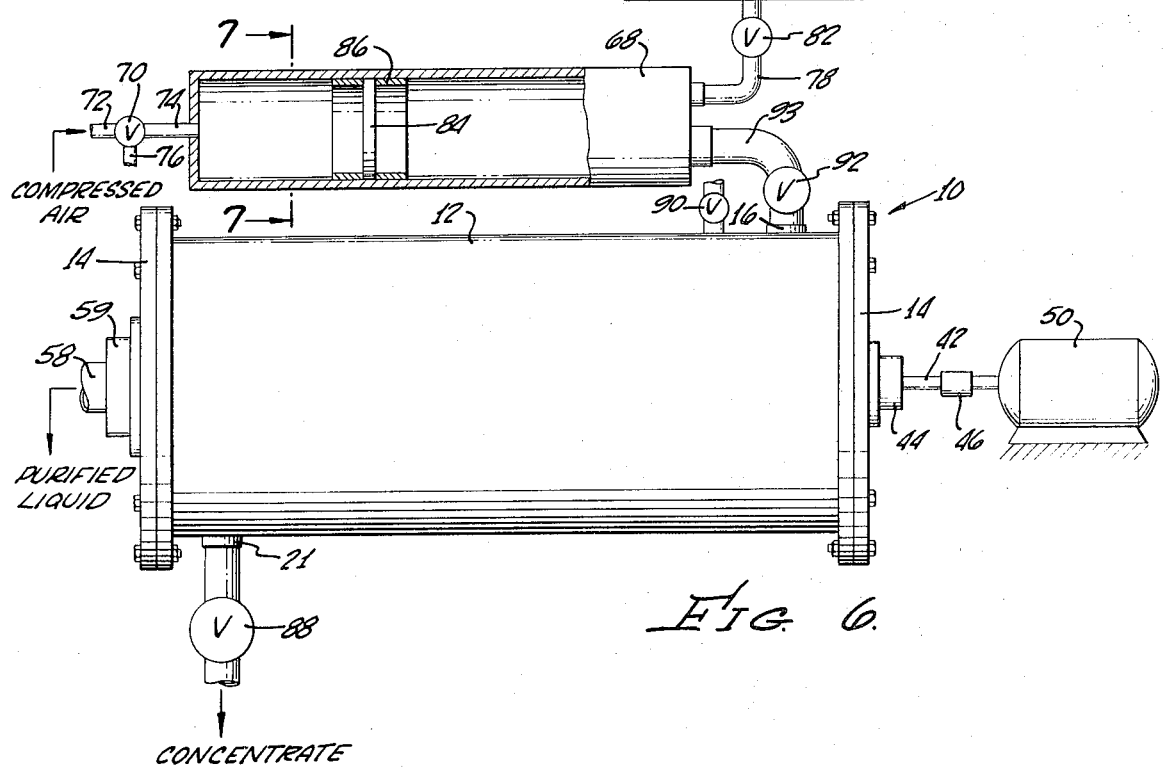
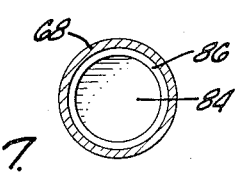

REVERSE OSMOSIS OR ULTRAFILTRATION MODULE

BACKGROUND OF THE INVENTION

1. Field of the Invention

This invention relates to apparatus for purification or concentration of solutions by reverse osmosis or ultrafiltration.

2. The Prior Art

Reverse osmosis and ultrafiltration apparatus used and proposed by the prior art has employed various types of semi-permeable membrane support structures enclosed in pressure resistant containers to which feed liquid to be treated is supplied under elevated pressure. Purified liquid is collected from the membrane support structures and liquid more concentrated with respect to a solute contained in the feed liquid is released from the pressure resistant containers while retaining operating pressure therein. Feed liquid must be supplied to said pressure resistant container at a rate to replace purified liquid collected and also liquid more concentrated in solute which is released from the pressure container. Additionally it is necessary that the rate of feed liquid introduction and concentrate release be sufficient to provide turbulent or high shear flow conditions in the liquid passing over the semipermeable membrane surface or surfaces. Since purified liquid is being extracted by passage through the semipermeable membrane a layer of liquid of high solute concentration tends to form in the liquid boundary layer which is adjacent the membrane surface. This type of boundary layer formation is extremely deleterious since it presents a solution much higher in solute content to the membrane surface resulting in lowered efficiency and poorer reverse osmosis or ultrafiltration effects, and may in cases result in precipitation of slime and insoluble salts which may blind the membrane surface. In ultrafiltration processes particularly, a boundary layer gel may form which appreciably slows down the separation process. Turbulent or high shear liquid flow over the membrane surface or surfaces is effective to prevent boundary layer problems. However, sufficiently high liquid flow rate must generally be employed to maintain turbulent flow through given size channels, or the channel size must be small enough to insure turbulent or high shear flow at any given flow rate. Small channels are often not desirable since they may tend to be clogged by particulate matter in the feed liquid, and result in higher pressure drop and greater pumping expense. Greater than otherwise required flow rates result in lower product recovery and higher pumping costs for the increased volume required.

In prior art reverse osmosis and ultrafiltration systems, modules comprising pressure resistant containers housing semipermeable membranes supported as described, are often connected in series. Such series connection is designed to recover as much as possible purified liquid or concentrate from the feed by passing the concentrate from one module to the next in succession. A disadvantage of this arrangement is that the modules further removed from the initial feed liquid input receive a progressively smaller volume of solution because purified liquid is being extracted by passage through each previous module. Series-parallel arrangements are therefore used and referred to as "pyramiding" to maintain sufficient liquid flow to maintain turbulence in the latter modules in the system without feeding a disproportionately large volume of feed liquid to the earlier or initial modules. If small channels are arranged to insure turbulence, the pressure drop or resistance to flow may become so great that booster pumps may be required to maintain adequate solution pressure in the latter modules in the series.

SUMMARY OF THE INVENTION

Summarized briefly this invention provides apparatus and method for treating a solution by reverse osmosis or ultrafiltration in which at least one membrane element and preferably a plurality of such membrane elements, comprising porous supports having semipermeable membranes on their outer surface, are employed inside a pressure resistant container. Feed solution is supplied to the outer surface of the membrane element inside the pressure resistant container, solution more concentrated with respect to a solute present in the feed solution if released from the pressure resistant container, and purified solution is collected from the interior of the membrane element or elements. A principal feature of this invention comprises mounting the membrane element or elements on a rotatable frame inside the pressure resistant container and providing means for rotating the frame. The axis of each membrane element is spaced apart from the axis of rotation of the rotatable frame and if more than one membrane element is used these are spaced apart one from another and are spaced apart radially from the axis of rotation of the rotatable frame. A baffle or baffles may be arranged to guide the flow of liquid over the semipermeable membrane surfaces, and a blade or blades may be arranged as part of the frame, preferably attached to its central axle, which will agitate the solution in the pressure resistant container to insure additional turbulence of liquid flow. Such apparatus is versatile in operation. Liquid to be treated may be supplied at elevated pressure to the pressure resistant container and solution concentrated with respect to solute may be released from the pressure resistant container through a back pressure regulator valve which, while releasing solution, maintains solution operating pressure within the pressure resistant container. Rotation of the membrane element frame maintains turbulent flow of liquid over the semipermeable membrane surfaces to promote efficient separation of purified liquid, without requiring excessive pumping rates, or employing small channels resulting in high pressure drop with high pumping cost and deleterious clogging tendency. Alternatively, the liquid may be treated by filling the pressure resistant container with feed liquid with its outlet closed, and supplying sufficient feed liquid under pressure to maintain operating pressure within the pressure resistant container and to replace purified liquid collected from the membrane support elements, while the frame holding the membrane support elements is being rotated. When the solute in the liquid in the pressure resistant container has reached the desired concentration, this liquid is dumped and the pressure resistant container refilled with fresh feed liquid and the sequence of operations repeated. This type of batch, or intermittent operation is especially suited for an embodiment in which the concentrated liquid is the desired product, as in food product concentration.

BRIEF DESCRIPTION OF THE DRAWINGS

Details of the construction and operation of the apparatus and method of this invention will be more readily understood by reference to the annexed drawings in which:

FIG. 1 is a side view, partly broken out, of a module embodying features of this invention.

FIG. 2 is a vertical cross section of the module of FIG. 1 taken along the line 2—2.

FIG. 3 shows enlarged and in more detail a membrane element employed in the embodiment of the invention shown in FIG. 1.

FIG. 4 shows a modified frame carrying membrane elements and having liquid control baffles.

FIG. 5 is a vertical cross section of the frame of FIG. 4 taken along the line 5—5.

FIG. 6 illustrates a modified embodiment of this invention with a liquid supply device shown partly broken out.

FIG. 7 is a vertical section of the liquid supply device of FIG. 6 taken along the line 7—7.

DESCRIPTION OF PREFERRED EMBODIMENTS

Referring particularly to FIG. 1, the module indicated generally at 10 comprises a pressure resistant container formed of tubular shell 12 with ends 14 conventionally attached thereto as by nuts and bolts 15, the materials and design being of sufficient strength to withstand the elevated operating pressure employed. Shell 12 is provided with liquid inlet 16 connected to a high pressure pump 18 by pipe 19, pump intake 20 being connected to a source, not shown, of liquid to be treated. Shell 12 is also provided with liquid outlet 21 connected to a pressure regulator valve, or back pressure control valve as it may be called, 22 by pipe 23. Valve outlet 24 may be connected to sewer or other disposal, or collection or storage means, not shown. The pressure regulator valve 22 releases concentrated liquid from the interior of module 10 while maintaining operating pressure therein.

Inside shell 12 are arranged at least one, and preferably as shown, a plurality of membrane elements 25 each of which comprise, as will be seen more clearly in the detailed drawing of FIG. 3, a tubular support 26 of any suitable material of sufficient strength to withstand operating pressure and which is perforated at intervals as at 28 and around which is wound an under layer of nylon cloth 30 to provide lateral transport of liquid to perforations 28 from an outer helically wound strip of semipermeable membrane 32. Preferably the turns of helically wound membrane strip 32 overlap and are sealed by a suitable adhesive or bonding agent. The ends of semipermeable membrane strip 32 and nylon cloth underlayer 30 are fastened and sealed to the end surfaces of tubular support 26 by adhesive tape wrappings 34. In one end of tubular support 26 is attached and sealed a tapered plug 36, and to the other end is attached and sealed a bored extension 38 communicating with the interior of tubular support 26. An O-ring seal 39 encircles bored extension 38 lying in a conventional groove as shown. The construction and operation of such membrane elements is more particularly described and claimed in U.S. Pat. No. 3,578,175 issued May 11, 1971.

Reverting again to FIG. 1 is a plurality of membrane elements (two being shown in the drawings for the sake of clarity) are maintained or carried inside shell 12 by a rotatably mounted frame comprising an end plate 40 adjustably fastened centrally to a shaft 42 by lock nuts 43 on either side on a threaded section of shaft 42, which passes through one of the pressure container ends 14, its passage therethrough being sealed by a suitable, commercially available seal bearing 44. Shaft 42 is joined as by coupling 46, to the output shaft 48 of electric motor 50 for continuous rotation. At the other end inside module 10 is arranged a second frame end plate 52 having holes 54 communicating with internal transfer passages 56 which in turn communicate with the bore of hollow trunnion 58 which passes through the other pressure container end 14 being sealed in its passage therethrough by another conventional seal bearing 59.

To assemble the rotatably mounted frame carrying membrane elements 25, the element ends fitted with extensions 36 are inserted in holes 54 in frame end plate 52, the extensions 36 being sealed to the walls of holes 54 by O-ring seals 39. The other ends of membrane elements 25, fitted with tapered plugs 36 are inserted in mating conical depressions in frame end plate 40. Shaft 42 extends through the central longitudinal axis of the membrane carrying frame and is threaded at its internal end into frame end plate 52 and securely fastened by lock nut 60. End plate 40 is adjusted on shaft 42 so that membrane elements 25 are securely held in place, being in spaced apart relationship to each other and spaced apart from the central longitudinal axis about which their supporting frame is rotated, that is shaft 42. When frame end plate is properly adjusted it is securely fastened to shaft 42 by tightening lock nuts 43.

It will be seen that the transfer passages 56 in frame end plate 52 and the bore of hollow trunnion 58 comprise collecting means for purified water from the interior of membrane elements 25.

Shaft 42 is additionally provided with one or more blades 62 which additionally agitate the solution inside module 10 when shaft 42 is rotated. One set of these blades is seen most clearly in FIG. 2.

Referring now to FIGS. 4 and 5 the frame carrying the membrane elements 25 has modified end plates 40a and 52a similar to plates 40 and 52 in FIG. 1 but of slightly larger diameter. Fixedly attached between frame ends 40a and 52a are outer baffles 64 and inner baffles 66 which for part of their widths are contoured to follow the general outlines of membrane elements 25 and with spaced apart end edges to guide the flow of liquid around the outer surfaces of membrane elements 25 when their carrying frame is rotated.

In FIGS. 6 and 7 is shown a modified system employing features of this invention particularly adapted for particular applications where batch processing may be advantageous, for example in food products or by-product concentration. In FIG. 6 the module 10 is of a type described previously with respect to FIGS. 1 to 5 and having a shaft 42 rotated through coupling 46 by electric motor 50, and having a liquid inlet 16, a liquid outlet 21 and purified liquid collection means including hollow trunnion 58. In this embodiment liquid inlet 16 is connected to one end of cylinder 68, the other end of cylinder 68 being connected to three way valve 70 which can direct fluid under pressure, such as compressed air, into cylinder 68, through pipes 72 and then through pipe 74, or alternatively compressed fluid pipe 72 may be shut off and bleed pipe 76 opened. The first referred to end of cylinder 68, that is the one connected to the module inlet 16, is also connected by pipe 78 to feed liquid tank 80, the flow through pipe 78 being controlled by valve 82. Inside cylinder 68 is floating piston 84 which is free to travel longitudinally back and forth inside cylinder 68 being maintained in vertical alignment (with respect to the horizontal cylinder shown) by guide ring 86 by which it is also slidingly sealed to the inner wall of cylinder 68.

Valve 88 controls the release of concentrate through outlet 21. A valved vent 90 is let into the top of shell 12, and an additional valve 92 is arranged in the liquid feed line 93 which connects the feed end of cylinder 68 to inlet 16 of module 10.

In operation of the apparatus of FIGS. 1 to 5, feed liquid which may be brackish water from which it is desired to separate purified water and brine, is supplied to the inlet of pump 18 which introduces the feed at, for example, 600 psi pressure and at a rate of 2 gallons per minute into module 10, through inlet 16. Back pressure regulator valve 22 is adjusted to maintain about 575 psi pressure in module 10 while releasing about ½ gallon per hour of brine, that is liquid concentrated in the solute originally contained in the feed liquid. Purified liquid which has passed through the semipermeable membrane surfaces of membrane elements 25 is collected from the interiors of membrane elements 25 through transfer passages 56 in frame end plate 52 or 52a and outflows from hollow trunnion 58. Meanwhile the membrane carrying frame inside module 10 is continuously rotated by electric motor 50 acting through central shaft 42 at a speed of about 180 revolutions per minute to provide a rate of travel of the membrane elements of about 3 feet per second when the elements shown are spaced 2 inches from the frame central axis to provide a travel path for each revolution of about 12 inches. Under such conditions brackish water containing 5,000 ppm total dissolved solids may be treated to provide a 80 percent recovery of purified water containing less than 500 ppm total dissolved solids, and a concentrate or brine containing 23,000 ppm of solute. The high recovery of purified product is made possible by the excellent liquid flow conditions over the membrane surfaces. The total energy required to pump the volume of feed liquid at 600 psi plus that required to rotate the membrane element carrying frame inside module 10 is substantially less than would be required to pump a sufficiently large volume of liquid at 600 psi to provide equivalent agitation and turbulent flow conditions over the surfaces of membrane elements 25. The embodiment shown in FIGS. 4 and 5 may be found to be somewhat more efficient when more uniform, yet turbulent flow over the membrane surfaces is required since cavitation and differences in flow conditions at various locations around the peripheries of membrane elements 25 may be reduced.

The system of FIGS. 6 and 7 may be particularly advantageous when using batch processing techniques, for example, to concentrate food products; a "loose" type membrane being used on membrane elements 25. In operation, for example, to concentrate the protein content of cheese whey, the whey is contained in feed tank 80 and valves 82 and 92 are opened to allow feed liquid to fill module 10, valved vent 90 being open and outlet valve 88 being closed. At the same time 3 way valve 70 is set to shut off a compressed air supply at 100 psi connected to pipe 72, and to open bleed 76. After module 10 is filled with feed liquid, the interior of cylinder 68 is also filled, floating piston 84 being forced all the way to its left hand end (in the drawing). Valve 82 and vent 90 are then shut, valve 88 remains shut and valve 70 is turned to shut off bleed 76 and to open the end of cylinder 68 to compressed air supplied through pipe 72. At the same time electric motor 50 is turned on to rotate the membrane element carrying frame inside module 10. With application of working pressure; liquid purified with respect to its protein content flows through the membrane 32 into the interiors of support tube 26, through transfer passages 56 and out hollow trunnion 58. Meanwhile the volume of this liquid removed is replaced in module 10 by the action of piston 84 which forces additional fresh feed liquid into module 10 through intake 16 at the same time maintaining the 100 psi operating pressure on the whey being treated in module 10. The rate of dewatering will depend of course on the type of membrane, the original and desired protein concentration and other factors. As an example, the protein concentration in the whey in module 10 can be raised from an original 0.6 percent by weight to 6.0 percent, a ten times concentration. Electric motor 50 is then shut down, outlet valve 88 is opened, valved vent 90 is opened, valve 92 is closed and the concentrate in the module is dumped through outlet 88. Valve 88 is then closed and the cycle repeated. The intermittent release of concentrated solution and introduction of fresh solution to the module provides operating conditions under which efficient concentration of the feed liquid to the required degree can be obtained; purified liquid (that is purified with respect to the solute it is desired to concentrate) being continuously collected and withdrawn, while sufficient fresh feed liquid to replace this amount is continuously added at operating pressure to the module.

The apparatus of this invention is useful for treatment of solutions by reverse osmosis or ultrafiltration to produce a purified solution, and a solution more concentrated with respect to a solute present in the original solution. An important feature of the invention, as has been pointed out above, is that rotation of the membrane element carrying frame provides turbulence in the liquid passing over the semipermeable membrane surface or surfaces independent of the rate of flow of liquid through the stationary pressure resistant container. This separation of functions is advantageous in that less total power or energy is required to maintain operating pressure and to rotate the membrane element carrying frame according to this invention than would be required to provide turbulence induced solely by passage of sufficient liquid at operating pressure over the semipermeable membrane surfaces and through the pressure resistant container. Raising the pressure of a liquid to the level required for reverse osmosis (up to 1,000–1,500 psig) requires substantial energy. Raising the pressure and pumping sufficient volume at this elevated pressure to produce turbulence in a reverse osmosis module often requires excessive energy consumption which is avoided by the practice of the present invention. Additionally, since circulation is separated from pressurization, batch methods may advantageously be employed particularly for concentrating liquids as in treatment of food products. Rotation of a membrane carrying frame inside a pressure resistant container can provide turbulence and boundary layer control over the membrane surface which could be impossible, or at best uneconomical, to obtain by passage through the pressure container of the necessary volume of liquid to be concentrated under operating pressure. Batch operation also provides opportunity for cleaning and sterilizing the apparatus between batches, which may be advantageous when processing food products or medical supplies.

I claim:

1. Apparatus for treating a feed solution to produce a solution more concentrated with respect to a solute present in said feed solution, and a purified solution; said apparatus comprising a pressure resistant container, at least one membrane element comprising a tubular porous support having a semipermeable membrane covering its outer surface inside said pressure resistant container, means for supplying said feed liquid under pressure to the semipermeable membrane covered surface of said membrane element inside said pressure resistant container, means for withdrawing solution more concentrated with respect to said solute from said pressure resistant container, and means for collecting purified liquid from the interior of said porous support element; in which the improvements comprise:
   a. a stationary pressure resistant container;
   b. a membrane element carrying frame rotatably mounted inside said stationary pressure resistant container maintaining said membrane element in an eccentric position spaced apart from the axis of rotation of said membrane element carrying frame; and
   c. means for continuously rotating said membrane element carrying frame during treatment of said feed solution.

2. Apparatus according to claim 1 in which a plurality of said membrane elements having semipermeable membranes covering their outside surfaces are maintained by said frame inside said pressure resistant container, in positions spaced apart from each other and spaced apart from the axis of rotation of said frame.

3. Apparatus according to claim 2 in which said frame comprises a pair of frame end plates each supporting ends of said membrane elements, one of said end plates having means for collecting purified liquid from the interiors of said membrane elements.

4. Apparatus according to claim 3 in which said pressure resistant container is a closed elongated tube and said frame end plates are mounted inside said pressure resistant container so as to be rotatable about the central longitudinal axis of said pressure resistant container.

5. Apparatus according to claim 3 in which said purified liquid collecting means include a hollow trunnion supporting one of said frame end plates and passing sealingly through the adjacent end of said pressure resistant container, and transfer passages in said frame end plate for transport of purified liquid from the interiors of said membrane elements to the interior of said hollow trunnion.

6. Apparatus according to claim 1 in which at least one agitator blade is attached to said frame to agitate the liquid inside said pressure resistant container during rotation of said frame.

7. Apparatus according to claim 1 in which the primary means for supplying feed liquid to the semipermeable membrane covered surface of said membrane element comprise a cylinder having a floating piston therein, one end of said cylinder being connected to the inlet of said pressure resistant container and to a source of supply of said feed liquid, and the other end of said cylinder adapted to be connected to a source of fluid under pressure.

8. A method for treating a feed solution to produce a solution more concentrated with respect to a solute contained in said feed solution, and a purified solution, in which the said feed solution is supplied under elevated pressure to the semipermeable membrane covered surface of at least one membrane element inside a stationary pressure resistant container, purified liquid is collected from the interior of said membrane element, and liquid more concentrated in said solute is released from said stationary pressure resistant container; in which the improvements comprise:
   a. continuously rotating said membrane element inside said stationary pressure resistant container about an axis spaced from the central axis of said membrane element while supplying feed liquid under elevated pressure for treatment in said stationary pressure resistant container.

9. A method according to claim 8 in which said solution is supplied to the semipermeable membrane covered surfaces of a plurality of said membrane elements which are spaced apart one from another and are rotated about an axis spaced apart from their central axes.

10. A method according to claim 8 in which feed liquid is supplied to said pressure resistant container at a rate to at least equal the amount to replace purified liquid collected from the interior of said membrane element, and liquid more concentrated with respect to said solute present in said feed solution is released from said pressure resistant container intermittently.

11. A method according to claim 10 in which said solution more concentrated with respect to said solute is replaced in said pressure resistant container by introduction intermittently of fresh feed liquid.

12. A method according to claim 11 in which the said fresh feed liquid is introduced into said pressure resistant container under substantially atmospheric pressure and subsequently pressurized inside said pressure resistant container.

13. A method according to claim 11 in which the said fresh feed liquid is introduced as a batch under substantially atmospheric pressure into said pressure resistant container and is pressurized inside said pressure resistant container by continuous introduction thereinto of sufficient additional fresh feed liquid under elevated pressure to maintain operating pressure in said pressure resistant container and to replace the purified liquid collected from the interior of said membrane element.

* * * * *